United States Patent
Araki

(10) Patent No.: US 7,670,066 B2
(45) Date of Patent: Mar. 2, 2010

(54) CAMERA DEVICE

(75) Inventor: Kazutoshi Araki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 815 days.

(21) Appl. No.: 11/504,598

(22) Filed: Aug. 16, 2006

(65) Prior Publication Data

US 2007/0041724 A1 Feb. 22, 2007

(30) Foreign Application Priority Data

Aug. 19, 2005 (JP) ............................. 2005-238996

(51) Int. Cl.
*G03B 17/00* (2006.01)
(52) U.S. Cl. ..................................................... 396/428
(58) Field of Classification Search ................ 396/419, 396/424, 427, 428

See application file for complete search history.

(56) References Cited

U.S. PATENT DOCUMENTS

| | | | | |
|---|---|---|---|---|
| 5,028,997 A * | 7/1991 | Elberbaum | .................. | 348/143 |
| 5,394,209 A * | 2/1995 | Stiepel et al. | .................. | 396/20 |
| 6,354,749 B1 * | 3/2002 | Pfaffenberger, II | .......... | 396/427 |
| 6,591,064 B2 * | 7/2003 | Higashiyama et al. | ......... | 396/18 |
| 6,715,940 B2 * | 4/2004 | Top et al. | ..................... | 396/427 |
| 6,793,414 B2 * | 9/2004 | Akada | ......................... | 396/427 |
| 6,793,415 B2 * | 9/2004 | Arbuckle | ..................... | 396/427 |
| 6,830,337 B2 * | 12/2004 | Angerpointner | ............. | 352/243 |
| 6,860,654 B1 * | 3/2005 | Ching-Wen | .................. | 396/427 |
| 6,890,110 B2 * | 5/2005 | Kajino et al. | ............... | 396/427 |
| 6,939,061 B2 * | 9/2005 | Sawada | ....................... | 396/427 |
| 7,180,547 B2 * | 2/2007 | Wei | ............................. | 348/375 |
| 7,202,904 B2 * | 4/2007 | Wei | ............................. | 348/373 |
| 7,303,171 B1 * | 12/2007 | Chen | ....................... | 248/184.1 |
| 7,324,154 B2 * | 1/2008 | Cheng | ......................... | 348/373 |
| 7,364,128 B2 * | 4/2008 | Donaldson et al. | ..... | 248/292.12 |
| 7,425,101 B2 * | 9/2008 | Cheng | ......................... | 396/427 |
| 7,440,027 B2 * | 10/2008 | Weaver | ....................... | 348/375 |
| 7,473,040 B2 * | 1/2009 | Kenoyer et al. | ............. | 396/428 |
| 7,520,685 B2 * | 4/2009 | Lee | ............................. | 396/427 |
| 7,534,057 B2 * | 5/2009 | Jones et al. | ................. | 396/427 |
| 2007/0010389 A1 * | 1/2007 | Cutrona et al. | ............. | 493/446 |

FOREIGN PATENT DOCUMENTS

| | | |
|---|---|---|
| JP | 11-196559 | 7/1999 |
| JP | 11-334471 | 12/1999 |
| JP | 2000-221379 | 8/2000 |

OTHER PUBLICATIONS

"Decision to Grant a Patent" issued by the Japanese Patent Office on Mar. 11, 2008, for corresponding Japanese Patent Application No. 2005-238996.

* cited by examiner

*Primary Examiner*—W. B. Perkey
(74) *Attorney, Agent, or Firm*—Finnegan, Henderson, Farabow, Garrett & Dunner, L.L.P.

(57) ABSTRACT

According to one embodiment, a camera device includes a camera body including an optical system, a rotational shaft having both ends extending on both sides from the camera body, and a pair of holders which rotatably support both ends of the rotational shaft, respectively and permit the camera body to rotate about the rotational shaft. At least one of the holders includes a cup-shaped bearing portion into which an end of the rotational shaft is inserted, a holder body, and a spring portion which extends from the holder body, supports the bearing portion at the extended end thereof, and urges the bearing portion toward the other holder side in the axial direction of the rotational shafts.

18 Claims, 5 Drawing Sheets

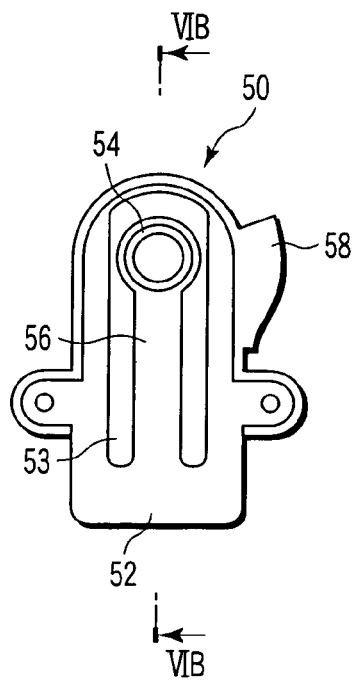 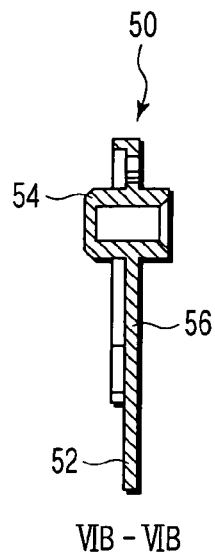 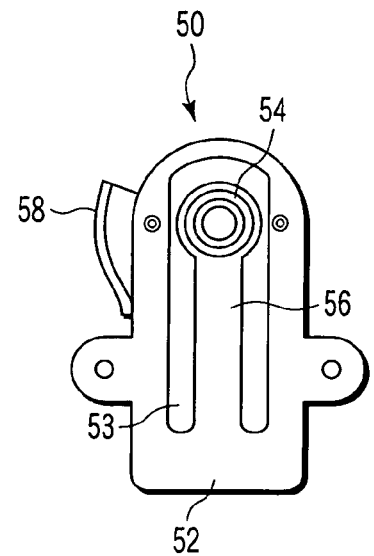
FIG. 6A  FIG. 6B  FIG. 6C
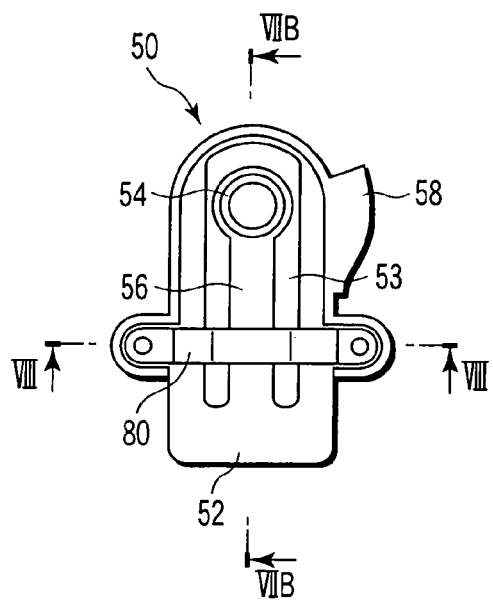 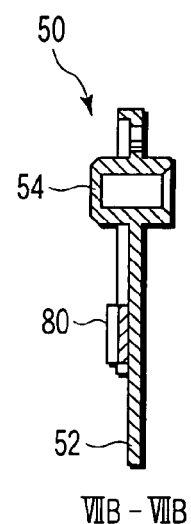
FIG. 7A  FIG. 7B
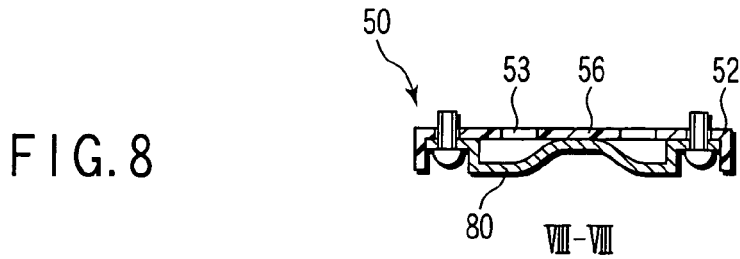
FIG. 8

CAMERA DEVICE

CROSS-REFERENCE TO RELATED APPLICATIONS

This application is based upon and claims the benefit of priority from Japanese Patent Application No. 2005-238996, filed Aug. 19, 2005, the entire contents of which are incorporated herein by reference.

BACKGROUND

1. Field

One embodiment of the invention relates to a camera device such as a monitor camera and the like that can adjust an image pick-up range, an image pick-up angle, and the like by remote control.

2. Description of the Related Art

A camera device, for example, a monitor camera is ordinarily arranged as a pair with image recording means so that it picks up images in a predetermined space, samples the picked up images at an appropriate timing, and records them by the image recording means. The monitor camera is configured to pick up images of only particular objects or to selectively pick up images at arbitrary positions in the periphery of the place where it is installed.

In a camera device configured to selectively pick up images in a periphery, a camera body rotates 350° in a horizontal direction and further rotates, for example, 120° in a vertical direction and can carry out focusing and zooming adjustment.

As disclosed in, for example, Jpn. Pat. Appln. KOKAI Publication Nos. 2000-221379 and 11-334471, the camera device ordinarily includes a camera body including lenses and a base, and the camera body is supported on the base so as to rotate about a horizontal axis and a vertical axis. Further, the camera device includes a drive mechanism so that the image pick-up direction and angle of the camera body can be adjusted by the drive mechanism. The drive mechanism has a motor, a power transmission mechanism, and the like mounted on the base or a bracket, and the camera body is driven by rotating the motor.

In the camera device capable of adjusting the image pick-up direction, angle and the like, both the ends of rotational shafts for rotatably supporting the camera body are rotatably supported by bearings, respectively. To secure a smooth motion of the camera body, the rotational shafts must be supported by bearings so that they can be smoothly rotated. At the same time, to pick up a distinct image by the camera body, not only the looseness of the rotational shafts in a radial direction but also the looseness of them in an axial direction must be prevented. To fulfill the above requirement, bearings must be formed with pinpoint accuracy and positioned and fixed with pinpoint accuracy. In this case, however, manufacturing cost is increased.

It is also contemplated to cause the rotational shafts to be engaged with a spacer as a method of reducing the looseness of the rotational shafts. In this case, however, the number of parts of the camera device is increased as well as an assembling property is deteriorated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6A is an exemplary front elevational view of one holder of the camera device, FIG. 6B is a sectional view of the holder taken along the line VIB-VIB of FIG. 6A, and FIG. 6C is a back elevation view of the holder;

FIG. 7A is an exemplary front elevational view of a holder of a camera device according to a second embodiment of the present invention, and FIG. 7B is an exemplary sectional view of the holder taken along the line VIIB-VIIB of FIG. 7A; and FIG. 8 is an exemplary sectional view of the holder taken along the line VIII-VIII of FIG. 7A.

DETAILED DESCRIPTION

Various embodiments according to the invention will be described hereinafter with reference to the accompanying drawings. In general, according to one embodiment of the invention, a camera device comprises: a base; a body bracket supported by the base to be rotatable about a first rotational shaft; a camera body including an optical system; a second rotational shaft having both ends extending on both sides from the camera body and extending in a direction orthogonal to the first rotational shaft; and a pair of holders which are provided on the body bracket, rotatably support both the ends of the second rotational shaft, and permit the camera body to rotate about the second rotational shaft, at least one of the holders integrally having a bearing portion supporting an end of the second rotational shaft, a holder body, and a spring portion which extends from the holder body, supports the bearing portion at the extended end thereof, and urges the bearing portion toward the other holder side in the axial direction of the second rotational shafts.

Figure 1:
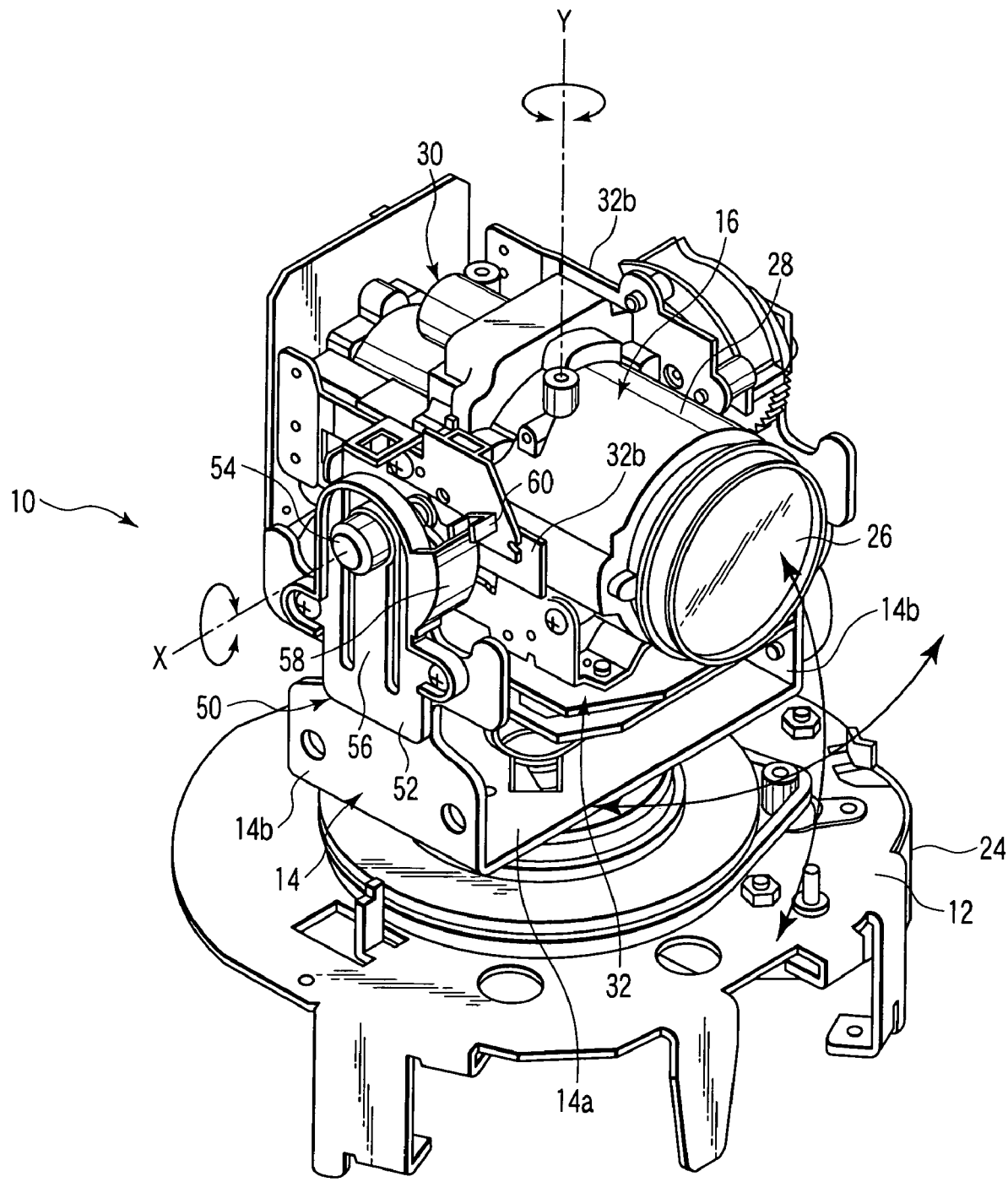
FIG. 1 is an exemplary perspective view showing a camera device in its entirety according to an embodiment of the present invention.
Figure 2:
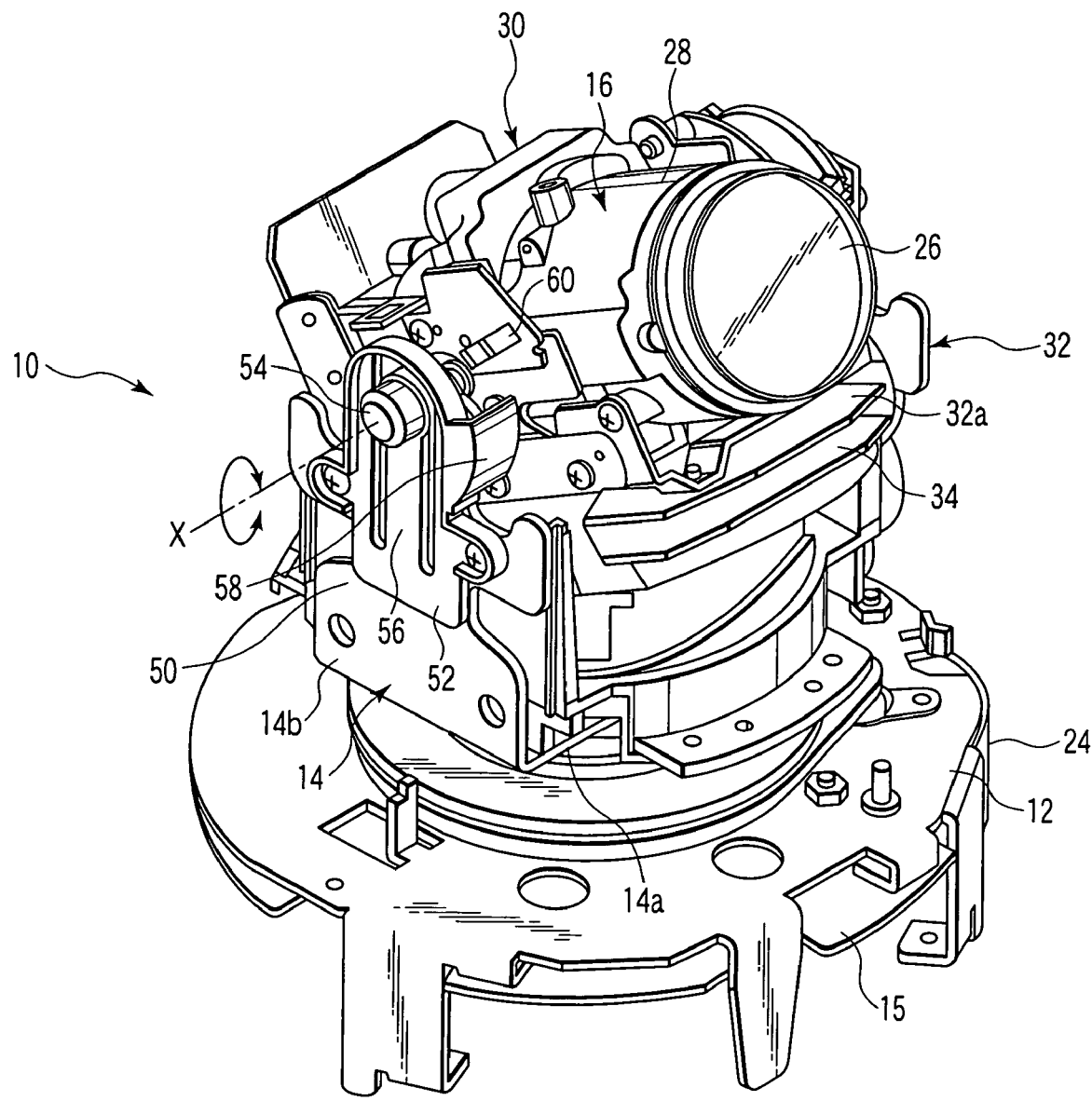
FIG. 2 is an exemplary perspective view showing the camera device in its entirety in which the rotational position of a camera body is changed.
Figure 3:
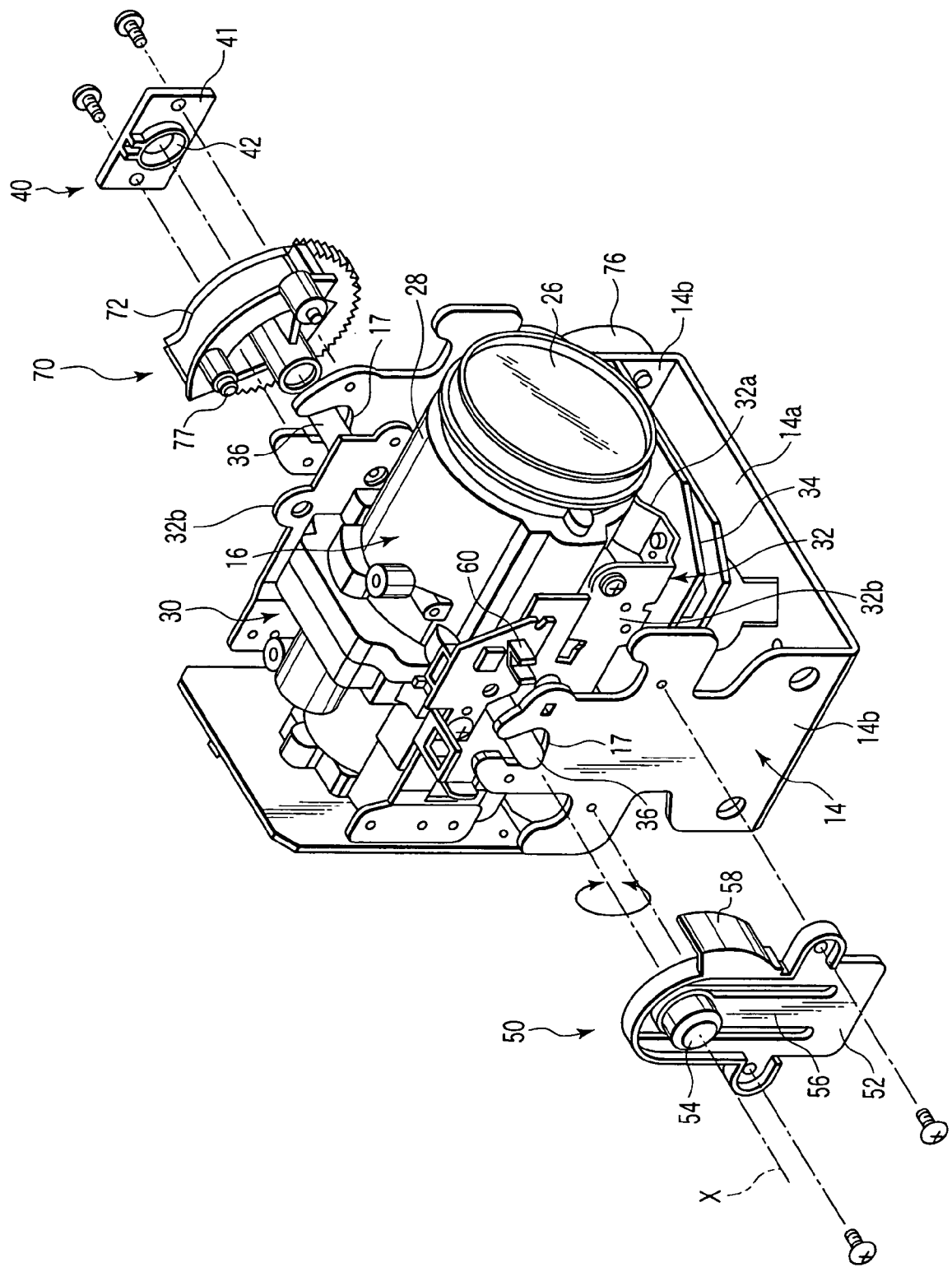
FIG. 3 is an exemplary exploded perspective view showing the camera body, a body bracket, and holders of the camera device.
Figure 4:
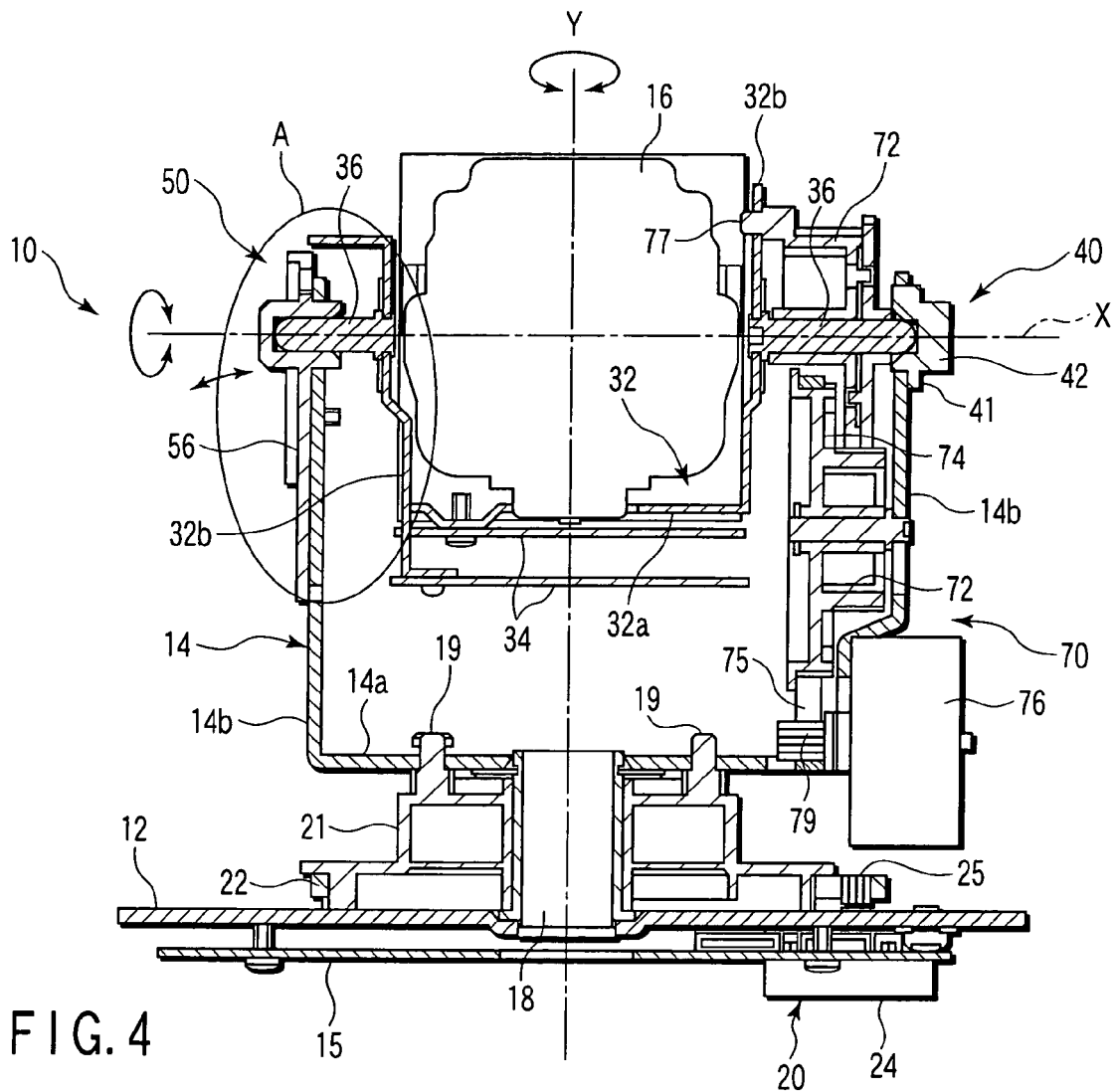
FIG. 4 is an exemplary sectional view of the camera device taken along the vertical axis thereof.
Figure 5:
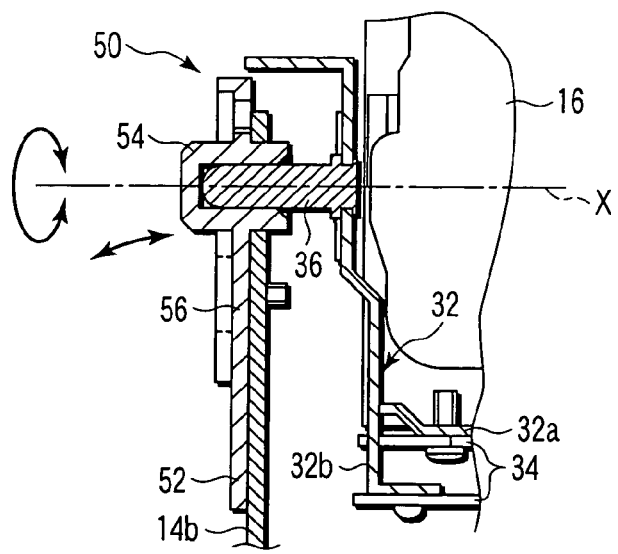
FIG. 5 is an exemplary sectional view showing a region A of FIG. 4 in enlargement.

FIGS. 1 and 2 show the camera device in its entirety, and FIG. 3 shows a part of the camera device in explosion, and FIG. 4 shows a cross section of the camera device.

As shown in FIGS. 1 to 4, a camera device 10 has a base 12, a body bracket 14 supported by the base so as to be free to rotate about, for example, a vertical axis Y, and a camera body 16 supported by the body bracket 14 so as to be rotatable about a horizontal axis X orthogonal to the vertical axis Y.

The base 12 is formed in an approximately flat plate shape, and a first hollow rotational shaft 18 is standingly disposed on the base 12 at a central portion of the upper surface thereof. The first rotational shaft 18 extends in parallel with the vertical axis Y. A printed circuit board 15 is arranged on the back surface of the base 12 and controls the operation of the camera device 10.

As shown in FIGS. 3 and 4, the body bracket 14 is formed by bending a metal plate and has a bottom wall portion 14a arranged opposing to the base 12 and a pair of side wall portions 14b standing perpendicular to the bottom wall portion 14a. The pair of side wall portions 14b extend in parallel with the vertical axis Y and confront each other across a space between them. The central portion of the bottom wall portion 14a is rotatably coupled with the first rotational shaft 18. With this arrangement, the body bracket 14 is supported by the base 12 to be rotatable about the first rotational shaft 18. A substantially circular notch 17 is formed in the extended end of each of the side wall portions 14b. These notches 17 are aligned in the horizontal axis X.

As shown in FIG. 4, a first drive mechanism 20 is disposed to the base 12 to rotate the body bracket 14. The first drive mechanism 20 includes a toothed pulley 21 and a first motor 24 for rotating the toothed pulley 21 through a synchronous belt 22.

The toothed pulley 21 is rotatably attached around the first rotational shaft 18. The toothed pulley 21 has plural projections 19 located around the first rotational shaft 18, and these projections 19 are engaged with the bottom wall portion 14a of the body bracket 14. With this arrangement, the toothed pulley 21 can be rotated together with the body bracket 14.

The first motor 24 is mounted on the back surface of the base 12 and a drive shaft thereof projects to the upper surface side of the base passing through the base. The drive shaft has a drive pulley 25 fixed thereto, and the synchronous belt 22 is stretched between the drive pulley 25 and the toothed pulley 21. When the first motor 24 is driven, the body bracket 14 is rotated through the drive pulley 25, the synchronous belt 22, and the toothed pulley 21.

As shown in FIGS. 1 to 3, the camera body 16 has a lens barrel 28, in which an optical system having an objective lens 26 is accommodated, a diaphragm (not shown) disposed on the base end side of the lens barrel 28, an image pick-up device (not shown) for picking up an optical image focused by the optical system, and a zoom/focus lens drive mechanism 30 for driving the lenses.

The camera body 16 has a lens bracket 32 fixed to the periphery of the lens barrel 28. The lens bracket 32 is formed by bending a metal plate and has a flat bottom wall portion 32a extending in a direction approximately parallel with the horizontal axis X and a pair of side wall portions 32b standing perpendicularly to the bottom wall portion 32a. The pair of side wall portions 32b extend in parallel with the vertical axis Y as well as confront each other across the lens barrel 28.

Circuit boards 34 are disposed on the bottom wall portion 32a of the lens bracket 32. One of the circuit boards 34 supplies a drive signal to the image pick-up device, and fetches an image pick-up signal of an image picked up by the image pick-up device and creates an image signal by processing the image pick-up signal, and the other of the circuit boards 34 controls the optical system such as the lens drive mechanism 30, the diaphragm, and the like.

The camera body 16 has a pair of second rotational shafts 36 fixed to the side wall portions 32b of the lens bracket 32. The second rotational shafts 36 extend in a direction orthogonal to the optical axis of the optical system supported by the lens barrel 28 as well as are aligned in a direction parallel with the horizontal axis X. Further, the second rotational shafts 36 project externally from both the sides of the camera body 16. Then, the pair of second rotational shafts 36 are supported by holders to be described later so as to be free to rotate with respect to the body bracket 14. With this arrangement, the camera body 16 is supported by the body bracket 14 to be rotatable about the second rotational shafts 36.

As shown in FIGS. 3 and 4, the pair of second rotational shafts 36 are rotatably supported by the holders 40, 50, respectively. The holder 40 has a rectangular plate-shaped holder body 41 and a cup-shaped bearing portion 42 formed at the central portion of the holder body 41 and is formed integrally of, for example, synthetic resin. The holder body 41 is fixed to one of the side wall portions 14b of the body bracket 14 from the outside by screws. A part of the bearing portion 42 is engaged with the notch 17 formed in the side wall portion 14b at a predetermined gap.

The extreme end of the one second rotational shaft 36 is inserted into the bearing portion 42 and covered with the cup-shaped bearing portion 42. The bearing portion 42 rotatably supports the extreme end of the second rotational shaft 36 as well as supports a load in a thrust direction. With this arrangement, the motions of the camera body 16 in the optical axis direction of the optical system and in the direction orthogonal to the optical axis direction are regulated by the bearing portion 42.

As shown in FIGS. 3 and 6A to 6C, the other holder 50 has an elongated and approximately plate-shaped holder body 52, a cup-shaped bearing portion 54, and a band-shaped spring portion 56 extending from the holder body 52 and having the bearing portion 54 disposed on the extended end thereof and is formed integrally of, for example, synthetic resin. The spring portion 56 is defined by an approximately U-shaped groove 53 formed in the holder body 52. The spring portion 56 is arranged as a cantilever structure and has a base end portion formed integrally with the holder body 52 and an extended end acting as a free end. The spring portion 56 extends in a direction parallel with the vertical axis Y. Further, a shield plate 58 extends laterally from the holder body 52. The shield plate 58 is formed integrally with the holder body 52.

The holder body 52 of the holder 50 is fixed to the other side wall portion 14b of the body bracket 14 from the outside by screws. A part of the bearing portion 54 is engaged with the notch 17 formed to the side wall portion 14b at a predetermined interval. The extreme end of the other second rotational shaft 36 is inserted into the cup-shaped bearing portion 54 and covered with it. The bearing portion 54 rotatably supports the extreme end of the second rotational shaft 36 as well as supports a load in a thrust direction. With this arrangement, the motions of the camera body 16 in the optical axis direction of the optical system and in the direction orthogonal to the optical axis direction are regulated by the bearing portion 45.

Since the bearing portion 54 is supported by the spring portion 56 having the cantilever structure, it can be bent in an axial direction, that is, in the extending direction of the second rotational shaft, by the elastic deformation of the spring portion. The dimensional relation among the bearing portion 54, the second rotational shafts 36, and the body bracket 14 is set such that the spring portion 56 is bent axially externally at all times. Accordingly, the spring portion 56 urges the bearing portion 54 and the second rotational shaft 36 toward the other holder 40 in the axial direction of the second rotational shaft 36 by the reaction force resulting from the elastic deformation of it. With this arrangement, the looseness of the camera body 16 including the second rotational shafts 36 in the horizontal axis X can be prevented. Note that the extreme ends of the respective second rotational shafts 36 are formed in a spherical shape. Accordingly, a load on the second rotational shafts 36 in rotate can be suppressed to a small value.

As shown in FIGS. 3 and 4, the camera device 10 includes a second drive mechanism 70 for rotating the camera body 16 about the second rotational shafts 36. The second drive mechanism 70 includes a gear 72, a toothed pulley 74 and a second motor 76 for rotating the toothed pulley 74 through a synchronous belt 75.

The gear 72 is fixed to the periphery of the one second rotational shaft 36 between the lens bracket 32 and the body bracket 14. The gear 72 has plural projections 77 located to the periphery of the second rotational shaft 36, and these projections 77 are engaged with side wall portion 32b of the lens bracket 32. With this arrangement, the gear 72 can be rotated together with the camera body 16.

The toothed pulley 74 is attached rotatably to the inner surface of the one side wall portion 14b of the body bracket 14. The toothed pulley 74 has a gear portion 78 meshed with the gear 72 integrally with it.

The second motor 76 is mounted on the body bracket 14, and a drive shaft thereof projects to the inside of the side wall portion 14b passing through the body bracket. The drive shaft has a drive pulley 79 fixed thereto, and the synchronous belt 75 is stretched between the drive pulley 79 and the toothed pulley 74. When the second motor 76 is driven, the camera body 16 is rotated about the second rotational shafts 36 through the drive pulley 79, the synchronous belt 75, the toothed pulley 74, and the gear 72.

A position detector, for example, a photo sensor 60 is attached to one side wall portion 32b of the lens bracket 32, that is, to the side wall portion 32b on the holder 50 side here to detect the rotational position of the camera body 16. The photo sensor 60 has a light emitting device and a light receiving device confronting each other at an interval.

The shield plate 58 formed integrally with the holder body 52 of the holder 50 constitutes a to-be-detected portion in the present invention and is disposed on a moving path of the photo sensor 60. When the camera body 16 and the photo sensor 60 rotate to a predetermined position about the second rotational shafts 36, for example, when the camera body 16 is rotated to a horizontal position as shown in FIG. 1, the shield plate 58 enters between the light emitting device and the light receiving device of the photo sensor 60 and shields an optical signal from the light emitting device. With this operation, the initial position of the camera body 16, that is, the horizontal position here is detected.

According to the camera device 10 arranged as described above, the camera body 16 can rotate about 350° about the first rotational shaft 18 and rotate about 120° about the second rotational shafts 36. The camera device 10 is installed at any arbitrary position and connected to a computer and the like through a network and the like. The camera body 16 is moved to an arbitrary rotational position through the computer, an image pick-up direction is arbitrarily selected, and manipulation such as zooming, focusing, and the like of the optical system is carried out.

At least the one end of the second rotational shafts that support the camera body is supported by the holder 50, and the lens bracket and the camera body are urged together toward the other holder 40 side by the spring portion 56 of the holder 50. Accordingly, the looseness in the axial direction of the second rotational shafts can be eliminated, and the positional error of the camera body in an image pick-up direction and vibration of the camera body when it is rotated can be reduced. As a result, it is possible to prevent blurring of an image pick-up screen and to pick up a distinct image having enhanced quality.

The holder 50 is composed of an integrally molded product having the holder body, the spring portion, and the bearing portion. Accordingly, it is not necessary to provide a separate member for urging the bearing portion, and a function as a bearing and a function for preventing looseness can be achieved by the single holder 50. As a result, it is possible to reduce the number of parts, to improve an assembling property, and to reduce manufacturing cost.

Further, according to the embodiment, the holder 50 has the shield plate used to detect the position of the camera body integrally with it. Accordingly, the holder 50 can be provided with a position detecting function, and thus the manufacturing cost can be more reduced.

From what has been described above, it is possible to obtain a camera device that can prevent looseness of a camera body, can pick up an image having enhanced quality and can reduce manufacturing cost.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

In the embodiments described above, although the holder having the spring portion integrally with it is disposed only to the one end of the second rotational shafts, the both ends of the second rotational shafts may be supported by a pair of the holder each having the spring portion integrally with it. Although the camera body is arranged to be free to rotate about the first and second rotational shafts, the present invention can be also applied to a camera device in which a camera body can be rotated only about second rotational shafts. Further, the first rotational shaft is not limited to the cantilever structure and may be rotatably supported at both the ends thereof likewise the second rotational shafts. In this case, at least one of the first rotational shafts is preferably supported by a holder having the spring portion described above integrally with it. The position detection sensor is not limited to the photo sensor and other sensor may be used.

The holder may include a reinforcing member for reinforcing the spring portion. According to an embodiment shown in FIGS. 7A, 7B, and FIG. 8, the holder 50 includes a metal leaf spring 80 which is fixed to a part of a spring portion 56, that is, fixed to a holder body 52 across the base end portion of it in this case. The leaf spring 80 is fixed to the body bracket of the camera device together with the holder body 52 at both the ends thereof by screws. The intermediate portion of the leaf spring 80 is abutted against the base end portion of the spring portion 56 so as to press the spring portion 56 in a rotational axis direction.

Provision of the reinforcing member compensates reduction of urging force of the spring portion 56 caused by deterioration with age and the like and can prevent looseness of the camera body for a long period of time.

Note that the reinforcing member is not limited to the leaf spring and a wire-like spring and the like may be used.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A camera device, comprising:
   a camera body including an optical system;
   a rotational shaft having two ends, each end extending from each side of the camera body, respectively; and a pair of holders which rotatably support both the ends of the rotational shaft and permit the camera body to rotate about the rotational shaft, wherein at least one of the holders includes a bearing portion supporting an end of the rotational shaft, a plate-shaped holder body, and a spring portion which extends from the holder body, the spring portion supporting the bearing portion at an extended end portion thereof, and urging the bearing portion toward the other holder side in an axial direction of the rotational shaft, wherein the spring portion is formed as part of the holder body and defined by a groove formed in the holder body, and wherein the holder including the bearing portion, the holder body, and the spring portion are integrally formed of synthetic resin.

2. The camera device according to claim 1, further comprises a position detector provided at the camera body so as to rotate together with the camera body and configured to detect the rotational position of the camera body, and the one of the holders has a to-be-detected portion which is detected by the position detector and formed integrally with the holder body.

3. The camera device according to claim 1, wherein the bearing portion is formed in a cup shape into which an end of the rotational shaft is inserted.

4. The camera device according to claim 1, wherein said at least one of the holders has a reinforcing member attached to the holder body and pressing the spring portion in the urging direction thereof.

5. The camera device according to claim 4, wherein the reinforcing member includes a metal spring.

6. The camera device according to claim 1, further comprising a base and a body bracket supported on the base to be rotatable about an axis orthogonal to the rotational shaft, the holder body of said at least one of the holders and the other holder are fixed to the body bracket, and the camera body is supported by the body bracket through the pair of holders.

7. The camera device according to claim 6, wherein the other holder has a holder body fixed to the body bracket and a bearing portion formed integrally with the holder body and into which the other end of the rotational shaft is inserted.

8. The camera device according to claim 6, further comprising a first drive mechanism which rotates the body bracket about the axis orthogonal to the rotational shafts and a second drive mechanism which rotates the camera body about the rotational shaft.

9. A camera device, comprising:
a base;
a body bracket supported by the base for rotating about a first rotational shaft;
a camera body including an optical system;
a second rotational shaft having two ends, each end extending from each side of the camera body, respectively, and extending in a direction orthogonal to the first rotational shaft; and
a pair of holders provided on the body bracket, each holder rotatably supporting each end of the second rotational shaft, respectively, and permitting the camera body to rotate about the second rotational shaft,
wherein at least one of the holders includes a bearing portion supporting an end of the second rotational shaft, a plate-shaped holder body, and a spring portion which extends from the holder body, the spring portion supporting the bearing portion at the extended end thereof, and urging the bearing portion toward the other holder side in an axial direction of the second rotational shafts,
wherein the spring portion is formed as art of the holder body and defined by a groove formed in the holder body, and
wherein the holder including the bearing portion, the holder body, and the spring portion are integrally formed of synthetic resin.

10. A camera device, comprising:
a camera body including an optical system;
a rotational shaft having two ends, each end extending from each side of the camera body, respectively; and
a pair of holders which rotatably support both the ends of the rotational shaft and permit the camera body to rotate about the rotational shaft,
wherein at least one of the holders integrally has a bearing portion supporting one end of the rotational shaft, a holder body, and a spring portion which extends from the holder body, the spring portion supporting the bearing portion at an extended end portion thereof, and urging the bearing portion toward the other holder side in an axial direction of the rotational shaft, and
wherein the bearing portion is formed in a cup-shape, an end of the rotational shaft being inserted into the cup-shaped bearing portion.

11. The camera device according to claim 10, wherein the holder including the bearing portion, the holder body, and the spring portion is formed integrally of synthetic resin.

12. The camera device according to claim 10, further comprises a position detector provided at the camera body so as to rotate together with the camera body and configured to detect the rotational position of the camera body, and the one of the holders has a to-be-detected portion which is detected by the position detector and formed integrally with the holder body.

13. The camera device according to claim 10, wherein said at least one of the holders has a reinforcing member attached to the holder body and pressing the spring portion in the urging direction thereof.

14. The camera device according to claim 13, wherein the reinforcing member includes a metal spring.

15. The camera device according to claim 1, further comprising a base and a body bracket supported on the base to be rotatable about an axis orthogonal to the rotational shaft, the holder body of said at least one of the holders and the other holder are fixed to the body bracket, and the camera body is supported by the body bracket through the pair of holders.

16. A camera device, comprising:
a camera body including an optical system;
a rotational shaft having two ends, each end extending from each side of the camera body, respectively; and
a pair of holders which rotatably support both the ends of the rotational shaft and permit the camera body to rotate about the rotational shaft,
wherein at least one of the holders integrally has a bearing portion supporting one end of the rotational shaft, a holder body, and a spring portion which extends from the holder body, the spring portion supporting the bearing portion at an extended end portion thereof, and urging the bearing portion toward the other holder side in an axial direction of the rotational shaft,
wherein at least one of the holders has a reinforcing member attached to the holder body and presses the spring portion in the urging direction thereof, and
wherein the reinforcing member includes a metal spring.

17. A camera device, comprising:
a base;
a body bracket supported by the base for rotating about a first rotational shaft;

a camera body including an optical system;

a second rotational shaft having two ends, each end extending from each side of the camera body, respectively, and extending in a direction orthogonal to the first rotational shaft; and a pair of holders provided on the body bracket, each holder rotatably supporting each end of the second rotational shaft, respectively, and permitting the camera body to rotate about the second rotational shaft, wherein at least one of the holders integrally has a bearing portion supporting an end of the second rotational shaft, a holder body, and a spring portion which extends from the holder body, the spring portion supporting the bearing portion at the extended end thereof, and urging the bearing portion toward the other holder side in an axial direction of the second rotational shaft, and wherein the bearing portion is formed in a cup-shape, an end of the second rotational shaft being inserted into the cup-shaped bearing portion.

18. The camera device according to claim 17, wherein the holder including the bearing portion, the holder body, and the spring portion is formed integrally of synthetic resin.

* * * * *